(12) United States Patent
Verrall et al.

(10) Patent No.: US 6,217,948 B1
(45) Date of Patent: *Apr. 17, 2001

(54) POLYMER FILM

(75) Inventors: Mark Verrall; David Coates, both of Dorset (GB)

(73) Assignee: Merck Patent Gesellschaft mit (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,012

(22) Filed: Sep. 16, 1998

(30) Foreign Application Priority Data

Sep. 17, 1997 (GB) .................................................. 97116150

(51) Int. Cl.$^7$ ........................... C09K 19/02; C09K 19/06; C08F 2/46; A21D 6/00
(52) U.S. Cl. .............................. 427/492; 427/504; 428/1; 252/299.6; 252/299.7
(58) Field of Search ...................... 428/1, 222; 427/492, 427/504; 252/299.6, 299.7

(56) References Cited

U.S. PATENT DOCUMENTS

| | | | |
|---|---|---|---|
| 5,668,614 | * 9/1997 | Chien et al. | 252/299.7 |
| 5,746,940 | * 5/1998 | Coates et al. | 252/299.01 |
| 5,798,147 | * 8/1998 | Beck et al. | 427/511 |
| 5,976,239 | * 11/1999 | Dannenhauer et al. | 252/299.7 |

* cited by examiner

Primary Examiner—Tae Yoon
(74) Attorney, Agent, or Firm—Millen, White, Zelano & Branigan, P.C.

(57) ABSTRACT

A polymer film with a helically twisted molecular structure exhibiting at least two maxima of the selective reflection wavelength. A process of preparing such a polymer film and processes for using such polymer film in optical data storage devices, photomasks, decorative pigments, cosmetics, security devices or active and passive optical elements such as polarizers, optical retarders or color filters.

13 Claims, 3 Drawing Sheets

POLYMER FILM

The invention relates to a polymer film with a helically twisted molecular structure exhibiting at least two maxima of the selective reflection wavelength, said polymer film being obtainable by a process comprising the following steps
A) coating a thermochromic polymerizable mesogenic composition comprising the following components
   a) at least one achiral polymerizable mesogenic compound,
   b) at least one chiral compound that is optionally also polymerizable and/or mesogenic,
   c) a polymerization initiator, and
   d) optionally a dye component,
   on a substrate or between two substrates in form of a layer,
B) aligning the polymerizable mesogenic composition so that the axis of the molecular helix extends transversely to the layer,
C) optionally heating at least a part of the aligned composition to a defined temperature,
D) polymerizing at least a part of the aligned composition by exposure to actinic radiation,
E) optionally repeating step D) alone or together with step C) and/or steps A) and B) at least once, and
F) optionally removing the substrate or, if two substrates are present, one or both of the substrates from the polymerized material,
characterized in that the temperature is varied in step D).

The invention further relates to a process of such a polymer film and to the use of such a polymer film for optical data storage, photomasks, decorative pigments, cosmetics, security applications or active and passive optical elements such as polarizers, optical retarders or color filters.

Thermochromic materials, such as thermochromic compounds or compositions are characterized in that they show a change of the reflective wavelength upon temperature variation. They are well known in the prior art and usually consist of cholesteric liquid crystals (CLCs) with a helically twisted molecular structure, wherein the pitch p of the molecular helix is related to the reflected wavelength $\lambda$ and the average refractive index n of the liquid crystal by equation (1)

$$\lambda = n \cdot p \qquad (1)$$

If the reflected wavelengths are inside the visible range, the thermochromic material undergoes a visible colour change upon variation of the temperature.

Thermochromic compositions are disclosed for example in the international application WO 90/02161.

For many applications, such as optical information storage, security applications or the preparation of optical films like e.g. color filters, it is desirable that the reflected wavelength of the thermochromic material can be permanently fixed to remain constant over a broad range of temperatures. Furthermore, some applications like e.g. security devices or patterned color filters require that the material should exhibit more than one reflection maximum, in particular two or more reflective colors in the visible wavelength range, which furthermore should be temperature independent.

European Patent Application EP 0 661 287 A1 discloses cholesteric polymerizable liquid crystalline siloxanes with a temperature dependent reflection wavelength, and further proposes to prepare a structured color film by heating these materials to a given temperature and photopolymerizing them through a mask.

However, linear polymers and in particular siloxane polymers like those disclosed in EP 0 661 287 most often exhibit low glass transition temperatures and show only limited temperature stability. When heating these polymers, their optical properties are often deteriorating 1.

Consequently there is still a demand for a polymer film that exhibits two or more reflection maxima remaining almost constant over a wide temperature range, that has a high temperature stability, is easily obtainable and does not have the disadvantages of the materials of prior art as discussed above.

One of the aims of the present invention is to provide a polymer film having these properties. Another aim of the invention is to provide a process of preparing such a polymer film. Other aims of the present invention are immediately evident to the person skilled in the art from the following detailed description.

It has been found that the above mentioned aims can be achieved by providing a polymer film that is obtainable from a polymerizable thermochromic mesogenic composition with a helically twisted molecular structure by a process according to the present invention. In this process, the thermochromic composition is coated onto a substrate as a thin layer and aligned in a planar orientation. The helical pitch and thereby the reflection wavelength of the layer are then adjusted to the desired value temperature variation, and the molecular structure of the layer is fixed by polymerization, wherein the temperature is changed during the polymerization reaction so that the layer exhibits various reflective wavelengths which are subsequently fixed. This process yields a polymer film with two or more reflection wavelengths that remain stable over a wide temperature range.

One aspect of the present invention is a polymer film with a helically twisted molecular structure exhibiting at least two maxima of the selective reflection wavelength, said polymer film being obtainable by a process comprising the following steps
A) coating a thermochromic polymerizable mesogenic composition comprising the following components
   a) at least one achiral polymerizable mesogenic compound,
   b) at least one chiral compound that is optionally also polymerizable and/or mesogenic,
   c) a polymerization initiator, and
   d) optionally a dye component,
   on a substrate or between two substrates in the form of a layer
B) aligning the polymerizable mesogenic composition so that the axis of the molecular helix extends transversely to the layer,
C) optionally heating at least a part of the aligned composition to a defined temperature,
D) polymerizing at least a part of the aligned composition by exposure to actinic radiation,
E) optionally repeating step D) alone or together with step C) and/or steps A) and B) at least once, and
F) optionally removing the substrate or, if two substrates are present, one or both of the substrates from the polymerized material,
characterized in that the temperature is varied in step D).

Preferred embodiments of the present invention relate to a polymer film obtainable by a process as described above, wherein the temperature in step D) is varied continuously between a maximum and a minimum value, a polymer film obtainable by a process as described above, wherein in step D) the thermochromic polymerizable mesogenic composition is covered at least partially with a photomask, a polymer film obtainable by a process as described above, wherein the photomask exhibits at least one part having a transmission of the actinic radiation used in step D) that is different from at least one other part of the photomask, a polymer film obtainable by a process as described above wherein component b) of the thermochromic polymerizable mesogenic composition comprises at least one polymerizable mesogenic chiral compound, a polymer film exhibiting at least two different reflection maxima in the visible wavelength range.

Another aspect of the present invention is a process of preparing a polymer film with a helically twisted molecular structure exibiting at least two maxima of the selective reflection wavelengths as described above.

Another aspect of the present invention is a method of using a polymer film with a helically twisted molecular structure as described above for optical data storage, photomasks, decorative pigments, cosmetics, security applications or active and passive optical elements such as polarizers, optical retarders or color filters.

The terms polymerizable mesogen, polymerizable mesogenic compound or polymerizable liquid crystal or liquid crystalline compound as used in the foregoing and the following comprise compounds with a rod-shaped, board-shaped or disk-shaped mesogenic group (i.e. a group with the ability to induce mesophase behaviour in a compound comprising such a group). These compounds do not necessarily have to exhibit mesophase behaviour by themselves. In a preferred embodiment of the present invention they show mesophase behaviour only upon admixture with other compounds or upon polymerization of the polymerizable mesogenic compounds or the mixtures comprising them.

Preferably the polymerizable mesogenic compounds exhibit mesophase behaviour on their own.

The term "mesogenity supporting group" as used in the foregoing and the following is indicating a rod-shaped, board-shaped or disk-shaped group, which does not necessarily have to show mesogenic behaviour (i.e. the ability to induce mesophase behaviour in a compound comprising such a group) alone. It is also possible that such a group shows mesogenic behaviour if being combined in a compound with other groups, or if the compound comprising the mesogenity supporting group is polymerized or admixed with other compounds comprising the same or other mesogenic or mesogenity supporting groups.

The achiral polymerizable mesogenic compounds of component a) are preferably of formula I P—(Sp—X)$_n$—MG—R    I wherein P is CH$_2$=CW—COO—, WCH=CH—O—, or CH$_2$=CH—Phenyl—(O)$_k$— with W being H, CH$_3$ or Cl and k being 0 or 1, Sp is a spacer group having 1 to 20 C atoms, X is a group selected from —O—, —S—, —CO—, —COO—, —OCO—, —OCO—O—, —S—CO—, —CO—S— or a single bond, n is 0 or 1, R is an achiral alkyl radical with up to 25 C atoms which may be unsubstituted, mono- or polysubstituted by halogen or CN, it being also possible for one or more non-adjacent CH$_2$ groups to be replaced, in each case independently from each other, by —O—, —S—, —NH—, —N(CH$_3$)—, —CO—, —COO—, —OCO—, —OCO—O—, —S—CO—, —CO—S— or —C≡C— in such a manner that oxygen atoms are not linked directly to one another, or alternatively R is halogen, cyano or has one of the meanings given for P—(Sp—X)$_n$—, MG is a mesogenic or mesogenity supporting group preferably selected of formula II —(A$^1$—Z)$_m$—A$^2$—    II wherein Z is in each case independently —COO—, —OCO—, —CH$_2$CH$_2$—, —OCH$_2$—, —CH$_2$O—, —CH=CH—, —CH=CH—COO—, —OCO—CH=CH—, —C≡C— or a single bond, A$^1$ and A$^2$ are each independently 1,4-phenylene in which, in addition, one or more CH groups may be replaced by N, 1,4-cyclohexylene in which, in addition, one or two non-adjacent CH$_2$ groups may be replaced by O and/or S, 1,4-cyclohexenylene, or naphthalene-2,6-diyl, it being possible for all these groups to be unsubstituted, mono- or polysubstituted with halogen, cyano or nitro groups or alkyl, alkoxy or alkanoyl groups having 1 to 7 C atoms wherein one or more H atoms may be substituted by F or Cl, and m is 1, 2 or 3.

As for the chiral compounds of component b), in principal all compounds can be used that are known to those skilled in the art for this purpose. Typical compounds are e.g. the commercially available chiral dopants S 1011, R 811 or CB 15 (Merck KGaA, Darmstadt, Germany).

In a preferred embodiment of the present invention, component b) of the thermochromic polymerizable mesogenic composition is essentially consisting of polymerizable chiral compounds, preferably polymerizable chiral mesogenic compounds.

The polymerizable chiral compounds are preferably of formula III

P—(Sp*—X)$_n$—MG*—R*    III wherein

P, X and n have the meanings given for formula 1,

Sp* is a spacer group having 1 to 20 C atoms,

MG* is a mesogenic or mesogenity supporting group, which is preferably selected of formula II given above, and R* is H or an alkyl radical with up to 25 C atoms which may be unsubstituted, mono- or polysubstituted by halogen or CN, it being also possible for one or more non-adjacent CH$_2$ groups to be replaced, in each case independently from one another, by —O—, —S—, —NH—, —N(CH$_3$)—, —CO—, —COO—, —OCO—, —OCO—O—, —S—CO—, —CO—S— or —C—C— in such a manner that oxygen atoms are not linked directly to one another, or alternatively R* is halogen, cyano or has independently one of the meanings given for P—(Sp—X)n—, with at least one of Sp*, MG* and R* comprising a chiral structure element.

In another preferred embodiment of the present invention, component b) of the thermochromic polymerizable mesogenic composition is essentially consisting of non-polymerizable chiral mesogenic compounds such as e.g.

chiral dopants like those mentioned above. Particularly preferably non-polymerizable chiral compounds are used that comprise at least one chiral group MG* and/or R* as given in formula III.

Preferably the non-polymerizable chiral mesogenic compounds are of formula VI $$R^1-MG^1-G^2-MG^2-R^2 \qquad VI$$

wherein $MG^1$ and $MG^2$ each independently have one of the meanings of MG of formula II, $R^1$ and $R^2$ are each independently halogen, cyano or an optionally halogenated alkyl, alkenyl, alkoxy or alkanoyl group with 1 to 12 C atoms, and $G^2$ has the meaning of formula II*B described below. Very preferably $G^2$ is a chiral bivalent structure element based on a sugar molecule.

MG in formula I, MG* in formula III and $MG^1$ and $MG^2$ in formula VI are preferably selected of formula II. Bicyclic and tricyclic mesogenic groups of formula If are particularly preferred.

In another preferred embodiment of the invention the achiral polymerizable mesogenic compounds are selected according to formula 1, wherein R has one of the meanings of P—(Sp—X)$_n$— as given above.

Of the compounds of formula I and III especially preferred are those in which R and R* are F. Cl, cyano, or optionally halogenated alkyl or alkoxy, or has the meaning given for P—(Sp—X)$_n$— or P—(Sp*—X)$_n$— respectively. Further preferred are compounds wherein MG, $MG^1$, $MG^2$ and MG* are of formula II with $Z^1$ and $Z^2$ being each independently —COO—, —OCO—, —CH$_2$—CH$_2$—, —CH=CH—COO—, —OCO—CH=CH— or a single bond.

Of the mesogenic groups wherein $A^1$ and/or $A^2$ denote a heterocyclic group, those containing a pyridine-2,5-diyl group, pyrimidine-2,5-diyl group or 1,3-dioxane-2,5-diyl group are particularly preferred. Of the preferred mesogenic groups containing a substituted 1,4-phenylene group very particularly preferred are those substituted by F, Cl or an optionally fluorinated alkyl, alkoxy or alkanoyl group with 1 to 4 C atoms.

A smaller group of particularly preferred mesogenic groups of formula II is listed below. For reasons of simplicity, in these formulae PheL is 1,4-phenylene, which is substituted in 2- and/or 3-position with L, wherein L denotes halogen, a cyano or nitro group or an alkyl, alkyloxy or alkanoyl group having 1 to 7 C atoms wherein one or more H atoms may be substituted by F or Cl, and Cyc is 1,4-cyclohexylene. Z in these groups, unless otherwise indicated, has the meaning given in formula I as described above and below. The preferred mesogenic groups of formula 11 comprise those of formula II-1 to II-24 as well as their mirror images.

| | |
|---|---|
| -Phe-Z-Phe- | II-1 |
| -Phe-Z-Cyc- | II-2 |
| -Cyc-Z-Cyc- | II-3 |
| -PheL-Z-Phe- | II-4 |
| -PheL-Z-Cyc- | II-5 |
| -PheL-Z-PheL- | II-6 |
| -Phe-Z-Phe-Z-Phe- | II-7 |
| -Phe-Z-Phe-Z-Cyc- | II-8 |
| -Phe-Z-Cyc-Z-Phe- | II-9 |
| -Cyc-Z-Phe-Z-Cyc- | II-10 |
| -Phe-Z-Cyc-Z-Cyc- | II-11 |
| -Cyc-Z-Cyc-Z-Cyc- | II-12 |
| -Phe-Z-Phe-Z-PheL- | II-13 |
| -Phe-Z-PheL-Z-Phe- | II-14 |
| -PheL-Z-Phe-Z-PheL- | II-15 |
| -PheL-Z-PheL-Z-Phe- | II-16 |
| -PheL-Z-PheL-Z-PheL- | II-17 |
| -Phe-Z-PheL-Z-Cyc- | II-18 |
| -Phe-Z-Cyc-Z-PheL- | II-19 |
| -Cyc-Z-Phe-Z-PheL- | II-20 |
| -PheL-Z-Cyc-Z-PheL- | II-21 |
| -PheL-Z-PheL-Z-Cyc- | II-22 |
| -PheL-Z-Cyc-Z-Cyc- | II-23 |
| -Cyc-Z-PheL-Z-Cyc- | II-24 |

In the formulae II-1 to II-24, Z is preferably an ester group (—CO—O— or —O—CO—), —CH$_2$CH$_2$— or a single bond. L in these preferred formulae is preferably F, Cl, CN, NO$_2$, CH$_3$, C$_2$H$_5$, OCH$_3$, OC$_2$H$_5$, COCH$_3$, COC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$ and OCF$_3$, most preferably F, Cl, CH$_3$, OCH$_3$ and COCH$_3$. Particularly preferably MG, MG*, $MG^1$ and $MG^2$ are selected from the following formulae, including their mirror images ,

IIa

IIb

IIc

IId

IIe

IIf

IIg

-continued

IIh

IIi

IIk

IIm wherein L has the meaning given above and r is 0, 1 or 2.

The group in these preferred formulae is very preferably denoting furthermore with each L having, independently, one of the meanings given above.

In the achiral polymerizable mesogenic compounds of the formula 1, R is preferably an achiral alkyl radical which is unsubstituted or substituted by at least one halogen atom, it being possible for one or two non-adjacent CH$_2$ groups of these radicals to be replaced by —O—, —S—, O—CO—, —CO—O— or —O—CO—O— groups.

Halogen is preferably F or Cl.

If R is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, methoxy, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2- (=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

In the polymerizable mesogenic compounds of formula III, R* may be an achiral or a chiral group. In case of an achiral group, R* preferably has one the preferred meanings given for R above. In case of a chiral group, R* is preferably selected according to the following formula IV:

IV wherein
X$^1$ has the meaning given for X,
Q$^1$ is an alkylene or alkylene-oxy group with 1 to 10 C atoms or a single bond,
Q$^2$ is an alkyl or alkoxy group with 1 to 10 C atoms which may be unsubstituted, mono- or polysubstituted by halogen or CN, it being also possible for one or more non-adjacent CH$_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, or alternatively has the meaning given for P—Sp—,
Q$^3$ is halogen, a cyano group or an alkyl or alkoxy group with 1 to 4 C atoms different from Q$^2$.

Preferred chiral groups R* are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, for example.

In addition, mesogenic compounds of the formula I and/or III containing an achiral branched group R or R* respectively may occasionally be of importance as comonomers, for example, due to a reduction in the tendency towards crystallization. Branched groups of this type generally do not contain more than one chain branch.

Preferred achiral branched groups are isopropyl, isobutyl (=methylpropyl), isopentyl (=3-methylbutyl), isopropoxy, 2-methylpropoxy and 3-methylbutoxy.

In another preferred embodiment R* in formula III is denoting a chiral group that is selected from the following groups:

an ethylenglycol derivative wherein $R^1$ is an alkyl radical with 1 to 12 C atoms, or a group based on citronellol In another preferred embodiment of the present invention the compounds of formula III comprise a mesogenic or mesogenity supporting group MG* having at least one center of chirality. In these compounds MG* is preferably selected according to formula II*A or II*B:

II*A

II*B wherein
$A^1$, $A^2$ and Z have the meaning given in formula II,
R has the meaning given in formula I,
a and b are independently of each other 0, 1 or 2,
$G^1$ is a terminal chiral group, such as for example a cholesteryl group, a terpenoid radical, like e.g. disclosed in the WO 96/17901, particularly preferably a menthyl group, or a terminal chiral sugar derivative comprising a mono- or dicyclic radical with pyranose or furanose rings like, for example, a terminal group derived from the chiral sugars or sugar derivatives as disclosed e.g. in the international application WO 95/16007, and $G^2$ is a bivalent chiral group, like for example a (S,S)- or (R,R)-hydrobenzoin group or a bivalent chiral sugar, sugar derivative or another bivalent chiral radical, as disclosed e.g. in the international application WO 95/16007, especially preferably a group based on 1,4:3,6-Dianhydro-D-sorbitol:

In case G2 is a group based on 1,4:3,6-Dianhydro-D-sorbitol as diclosed above, Z is preferably denoting —CH=CH—.

In the compounds of formula I and III P is denoting $CH_2$=CW—COO, WCH=CH—O— or $CH_2$=CH—Phenyl—$(O)_k$— with W being H, $CH_3$ or Cl and k being 0 or 1.

Preferably P is a vinyl group, an acrylate or methacrylate group, a propenyl ether group or an epoxy group. Especially preferably P is an acrylate or methacrylate group.

The polymerizable mesogenic compounds have up to four, in particular up to three, very preferably one or two polymerizable groups.

As for the spacer groups Sp and Sp*, all groups can be used that are known for this purpose to those skilled in the art. The spacer is preferably linked to the polymerizable group P by an ester or etner group or a single bond. The spacer is preferably a linear or branched alkylene group having 1 to 20 C atoms, in particular 1 to 12 C atoms, in which, in addition, one or more, non-adjacent $CH_2$ groups may be replaced by —O—, —S—, —NH—, —N($CH_3$)—, —CO—, —O—CO—, —S—CO—, —O—COO—, —CO—S—, —CO—O—, —CH(halogen)—, —CH(CN)—, —CH=CH— or —C≡C—.

Typical spacer groups are for example —$(CH_2)_o$—, —$(CH_2CH_2O)_r$—$CH_2CH_2$—, —$CH_2CH_2$—S—$CH_2CH_2$— or —$CH_2CH_2$—NH—$CH_2CH_2$—, with o being an integer from 2 to 12 and r being an integer from 1 to 3.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyl-iminoethylene and 1-methylalkylene, for example.

In a preferred embodiment of the invention the polymerizable mesogenic compounds of formula III comprise a spacer group Sp* that is a chiral group of the formula V:

V wherein
$Q^1$ and $Q^3$ have the meanings given in formula IV, and
$Q^4$ is an alkylene or alkylene-oxy group with 1 to 10 C atoms or a single bond, being different from $Q^1$.

Further preferred are chiral spacer groups Sp* based on naturally available materials, such as e.g. citronellol or lactate derivatives. Particularly preferred are compounds of formula I and/or III wherein n is 1.

In a preferred embodiment, the inventive anisotropic polymers and cholesteric polymer films are obtained by copolymerizing mixtures comprising compounds of formula I and /or formula III wherein n is 0 and compounds of formula I and/or formula III wherein n is 1.

In the event that R, R* or $Q^2$ is a group of formula P—Sp—X— or P—Sp*—X— respectively, the spacer groups on each side of the mesogenic core may be identical or different.

Polymerizable mesogenic compounds according to formula I and III are described for example in WO 93/22397; EP 0 261 712; DE 19504224; DE 4408171 and DE 4405316. The compounds disclosed in these documents, however, are to be regarded merely as examples that should not limit the scope of this invention.

Examples representing polymerizable mesogenic compounds of formula I and III are shown in the following list of compounds, which should, however, be taken only as illustrative and is in no way intended to restrict the invention, but instead explain the present invention:

(Ia)

(Ib)

(Ic)

(Id)

(Ie)

(If)

(Ig)

(Ih)

(Ii)

(Ik)

(IIIa)

(IIIb)

(IIIc)

(IIId)

(IIIe)

(IIIf)

(IIIg)

(IIIh)

(IIIi)

(IIIk)

(IIIm)

(IIIn)

wherein x and y are each independently 1 to 12, v is 0 or 1, D is a 1,4-cyclohexylene or an optionally halogenated 1,4-phenylene group, T is a terpenoid radical like e.g. menthyl, Ch is a cholesteryl group, $R^0$ is halogen, cyano or a chiral or achiral alkyl or alkoxy group with 1 to 12 C atoms and $L^1$ and $L^2$ are each independently H, halogen, CN, or an alkyl, alkoxy or alkanoyl group with 1 to 7 C atoms.

In a preferred embodiment of the present invention the achiral polymerizable compounds of formula I are selected from the above formulae Ia to Ik wherein $R^0$ is an achiral group.

In another preferred embodiment of the present invention the chiral polymerizable compounds of formula III are selected from the above formulae IIIa to IIIm or of formula Ib to Ih wherein $R^0$ is a chiral group.

In another preferred embodiment of the present invention the chiral non-polymerizable compounds are selected from the following formulae VIa -continued VIb wherein E and F are each independently 1,4-phenylene or trans-1,4-cyclohexylene, v is 0 or 1, $Z^0$ is —COO—, —OCO—, —$CH_2CH_2$— or a single bond, and R is alkyl, alkoxy or alkanoyl with 1 to 12 C atoms.

The polymerizable mesogenic compounds of formula I and III and the non-polymerizable compounds of formula VI can be prepared by methods which are known per se and which are described, for example, in standard works of organic chemistry such as, for example, Houben-Weyl, Methoden der organischen Chemie, Thieme-Verlag, Stuttgart. Some specific methods of preparation can be taken from the examples.

In particular, the compounds of formula VIa and their synthesis are described in the International Application WO 98/00428, the entire disclosure of which is incorporated into this application by way of reference.

In order to exhibit thermochromic behaviour, the compounds and compositions used in the present invention have to exhibit a chiral mesophase, like e.g. a chiral smectic or chiral nematic (=cholesteric) liquid crystal phase with a helically twisted molecular structure. Furthermore, the thermochromic polymerizable compositions according to the present invention are preferably aligned in a uniform planar orientation, i.e. with the axes of the molecular helices extending substantially normal to the plane of the layer.

Especially preferred are thermochromic polymerizable compositions having a cholesteric phase. Of these preferred compositions, further preferred are those having a cholesteric phase and additionally a smectic phase at temperatures below the temperature range of the cholesteric phase.

The thermochromic compositions can show positive temperature dependency of the pitch, i.e. the pitch increases with increasing temperature, or alternatively they can exhibit negative temperature dependency, i.e the pitch decreases with increasing temperature.

In a preferred embodiment of the present invention the thermochromic polymerizable mesogenic composition exhibits a chiral mesophase with negative temperature dependency of the pitch.

In another preferred embodiment of the present invention the thermochromic polymerizable mesogenic composition exhibits a chiral mesophase with positive temperature dependency of the pitch.

Since the pitch is directly related to the reflected wavelength by the above mentioned equation (1), upon heating or cooling of such a thermochromic composition in its chiral mesophase one can observe a shift of the maximum of the wavelengths reflected by said composition to higher or lower values.

In case the reflection maximum of the composition is in the visible range of light, a color change of the thermochromic composition upon heating or cooling within its chiral mesophase is observed.

The pitch length and the thermochromic behaviour of a thermochromic polymerizable composition according to the present invention can be influenced by the ratio of achiral to chiral compounds in the composition. With increasing ratio of the chiral compounds usually the pitch length of the composition as well as the pitch length of the polymer film obtainable from this composition are decreasing.

Thus, the reflection maximum of an inventive polymer film can be tuned easily by varying the polymerization temperature and/or the ratio of the chiral and achiral components in the polymerizable thermochromic composition.

The process of preparing a polymer film according to the present invention employs the following steps A) coating a thermochromic polymerizable mesogenic composition as described above and below on a substrate or between two substrates in form of a layer, B) aligning the polymerizable mesogenic composition so that the axis of the molecular helix extends transversely to the layer, C) optionally heating at least a part of the aligned composition to a defined temperature, D) polymerizing at least a part of the aligned composition by exposure to actinic radiation, E) optionally repeating step D) alone or together with step C) and/or steps A) and B) at least once, and F) optionally removing the substrate or, if two substrates are present, one or both of the substrates from the polymerized material, wherein the temperature is varied in step D).

Since the temperature is changed during polymerization, the thermochromic polymerizable composition undergoes a change of the helical pitch and therewith of the reflection maximum. The various pitch lengths are fixed by the polymerization reaction and a polymer film is obtained that exhibits, depending on the type, degree and speed of temperature variation, a broad range of reflection colors.

In a preferred embodiment of the present invention the temperature is varied continuously during polymerization. In this way, a polymer film exhibiting a continuous spectrum of reflective colors can be obtained.

In another preferred embodiment of the present invention, the temperature is increased during polymerization in step D).

In another preferred embodiment of the present invention, the temperature is decreased during polymerization in step D).

It is also possible to vary the intensity of actinic radiation used for polymerization, e.g. by covering certain parts of the polymerizable thermochromic composition with a photomask.

Thus, a preferred embodiment of the present invention relates to a process as described above, wherein during polymerization a part of the layer of the polymerizable thermochromic composition is covered with a photomask that is not transmissive for the actinic radiation used for polymerization.

Thereby only the unmasked portions of the layer are polymerized, whereas the reflection maximum in the masked portions of the layer remains constant and can afterwards be altered and/or fixed independently of the unmasked parts of the layer.

In another preferred embodiment of the present invention a photomask is used that comprises different parts having different transmissivity for the actinic radiation used for polymerization.

As such a photomask it is possible to use e.g. a black and white photocopy or photograph exhibiting different grey shades, which is printed or copied onto a transparent material.

Preferably the photomask exhibits at least two, very preferably at least four, in particular at least six different parts having different transmission of the actinic radiation used for polymerization of the inventive thermochromic polymerizable composition.

If the layer of the thermochromic polymerizable mesogenic composition is covered by such a photomask and polymerized according to the inventive process as described above, at first only the parts of the layer beneath the most transparent parts of the photomask are polymerized, thus freezing in the reflection colour of the composition at the instant temperature in these parts, whereas the other parts of the layer remain unpolymerized.

Upon further progress of the polymerization reaction, the parts of the layer beneath the less transparent parts of the photomask are also polymerized and their color is frozen in. Since the temperature has meanwhile changed, the parts being polymerized later exhibit reflection colors that are different from the previously polymerized parts of the layer.

In this way a multi-colour image can be obtained. The number of different colors and the color, shades of such a multi-color image can be controlled by adjusting the various parameters of the production process, such as the speed of temperature variation, the intensity of the actinic radiation, eventually the variation of the actinic radiation, the total exposure time to the actinic radiation, and the number and intensity of the grey scales of the photomask.

The above mentioned color variations can be observed not only for the reflective colours, but also for the complementary secondary colors of the polymer film when being viewed in transmission (e.g. against a light source), e.g. if the film is released from the substrate or has been prepared on a transparent substrate.

The steps C) and D) of the process described above can be repeated at least one more time, wherein the layer in each repeated step C) is heated or cooled to a temperature that is different from the previous step C), and/or in each repeated step D) a part of the layer is masked during polymerization that is different from the part of the layer that was masked in the previous step D).

Another preferred embodiment of the present invention is related to a process for preparing a polymer film as described above, wherein as a substrate in step A) another polymer film is used that has been prepared according to the process comprising steps A) to F) described above.

Thus it is possible to prepare a multilayer polymer film with a pattern of the helical pitch, i.e. a multilayer film wherein each of the layers comprises at least one region with a reflection maximum that is different from at least one other region of the same layer and/or of least one other layer.

Another preferred embodiment of the present invention relates to a process comprising steps A) to F) described above, wherein in step D) one or more selected parts of the layer are polymerized by exposure to actinic radiation being emitted by a finely focussed irradiation source like, for example, a laser beam.

The polymerizable composition according to this preferred embodiment should preferably comprise a photoinitiator that shows absorption of the emission wavelength of the laser used for polymerization.

Another particularly preferred embodiment of the present invention relates to a process comprising steps A) to F) described above, wherein only selected parts of the thermochromic polymerizable composition are heated in step D), and optionally also in step C), by a finely focussed irradiation source like, for example, a laser beam.

The parts of the layer that are selectively heated by a laser beam according to this paticularly preferred embodiment are very preferably polymerized in step D) by exposure to a second laser beam that immediately traces the path of the first laser beam that was used for heating.

For example, for this particularly preferred embodiment a thermochromic polymerizable composition can be used that comprises an IR dye and a photoinitiator absorbing visible light, like e.g. Irgacure 1700 (Ciba Geigy AG). The heating of a selected part of the coated composition is carried out with an IR laser, and polymerization of the heated parts is achieved with a visible laser following the IR laser.

Further preferred is a process according to this particularly preferred embodiment wherein the heating of one or more selected parts of the layer and the polymerization of these selectively heated parts of the layer are achieved by irradiation with the same laser.

In order to effectively absorb the irradiation of the laser that is used for heating selected parts of the layer according to the preferred embodiments described above, the thermochromic polymerizable mesogenic composition preferably comprises a dye component that comprises one or more dye compounds and is absorbing at the emission wavelength of the laser that is used for heating selected parts of the layer in the above described process.

As a suitable dye for example an IR dye, a UV dye or a dye absorbing in the visible wavelength range can be used. A dichroic dye can also be used. The dye component should be adjusted to exhibit absorption in the range of the wavelength emitted from the laser.

Suitable dye compounds are described in the literature and can be chosen, for example from the group of benzophenones, benzotriazoles, cinnamic and salicylic acids and their respective derivatives, anthraquinone and azo or azoxy dyes, organic Ni complex compounds, natural substances such as, for example, umbelliferon and yellow dyes like, for example, methyl yellow.

In a particularly preferred embodiment of the present invention, the thermochromic polymerizable mesogenic composition comprises a dye component with one or more dye compounds absorbing in the IR wavelength range, like e.g. the commercially available SC100870 (ICI Corp.) or like e.g. the following compounds In another preferred embodiment of the invention a dye component is used that comprises one or more dye compounds that show absorption of He—Ne light (633 nm), like e.g. the following compounds In another preferred embodiment of the invention a dye component is used that comprises one or more dye compounds showing absorption of UV light, like e.g. the following dye compounds It is also possible to use a semiconductor laser with an emission wavelength in the range between 750 and 950 nm and a dye component adjusted to significantly absorb in this wavelength range.

The examples of dye compounds given above should be taken only as illustrative and are in no way intended to restrict, but instead to explain the present invention.

In another preferred embodiment of the invention the thermochromic polymerizable mesogenic composition preferably comprises a dye component comprising one or more dye compounds that are absorbing at the emission wavelength of the laser that is used for polymerization in step D) of the above described process. This dye component can effectively absorb the irradiation of the laser that is used for polymerization in order to reduce the curing time and/or to increase the polymerization rate.

This dye component is preferably chosen to be adjusted to exhibit a significant absorption in the range of the wavelength emitted from the laser that is used for polymerization in step D) as described above. In principle all the types and examples of dye compounds mentioned above can be used for this purpose.

In another preferred embodiment a photoinitiator is used in order to both absorb the emission wavelength of the laser used for heating the polymerizable composition and start the polymerization reaction. If the inventive compositions comprise a dye component described above and below, the ratio of the dye component is preferably 0.1 to 20%, very preferably 0.5 to 10%, in particular 1 to 5% by weight of the total mixture.

The dye component preferably comprises one to six, very preferably one to three, in particular one or two dye compounds. Most preferably a single dye compound is used.

According to the above described process of preparing an inventive polymer film, the thermochromic polymerizable mesogenic composition is coated onto one substrate or between two substrates, aligned into a uniform planar orientation and cured by exposure to heat or actinic radiation in the presence of an initiator.

A detailed description of this method can be found e.g. in D.J.Broer et al., Makromol. Chem. 190, pp. 2255 ff. (1989).

As a substrate for example a glass or quartz sheet as well as a plastic film or sheet can be used. It is also possible to put a second substrate on top of the coated mixture prior to, during and/or after polymerization. The substrates can be removed after polymerization or not. When using two substrates in case of curing by actinic radiation, at least one substrate has to be transmissive for the actinic radiation used for the polymerization.

Isotropic or birefringent substrates can be used. In case the substrate is not removed from the polymerized film after polymerization, preferably isotropic substrates are used.

It is also possible to use plastic films as substrates, for example plastic films that can be used in film production, like e.g. polyester films such as polyethyleneterephthalate (PET), or films of polyvinylalcohol (PVA), polycarbonate (PC) or triacetylcellulose (TAC). As a birefringent substrate for example an uniaxially stretched plastic film can be used. Preferably at least one substrate is a plastic substrate, especially preferably a PET film or a TAC film. PET films are commercially available e.g. from ICI Corp. under the trade name Melinex.

The coated layer of the thermochromic polymerizable mesogenic composition is aligned to give a planar orientation, i.e. wherein the axis of the molecular helix extends transversely to the layer.

A planar orientation can be achieved for example by shearing the material, e.g. by means of a doctor blade. It is also possible to apply an alignment layer, for example a layer of rubbed polyimide or sputtered $SiO_x$, on top of at least one of the substrates.

In another preferred embodiment, a second substrate is put on top of the coated material. In this case, the shearing caused by putting together the two substrates is sufficient to give good alignment.

Polymerization of the thermochromic polymerizable mesogenic composition takes place by exposing it to heat or actinic radiation in the presence of a polymerization initiator absorbing at the wavelength of said radiation.

Actinic radiation means irradiation with light, like UV light, IR light or visible light, irradiation with X-rays or gamma rays or irradiation with high energy particles, such as ions or electrons. As a source for actinic radiation for example a single UV lamp or a set of UV lamps can be used. Another possible source for actinic radiation is a laser, like e.g. a UV laser, an IR laser or a visible laser.

For example, when polymerizing by means of UV light, a photoinitiator can be used that decomposes under UV irradiation to produce free radicals or ions that start the polymerization reaction.

It is also possible to use a cationic photoinitiator, when curing reactive mesogens with for example vinyl and epoxide reactive groups, that photocures with cations instead of free radicals.

It is also possible to use a polymerization initiator that decoposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

In some cases it is of advantage to apply a second substrate not only to aid alignment of the polymerizable composition but also to exclude oxygen that may inhibit the polymerization. Alternatively the curing can be carried out under an atmosphere of inert gas. However, curing in air is also possible using suitable photoinitiators and high lamp power. When using a cationic photoinitiator oxygen exclusion most often is not needed, but water should be excluded.

In a preferred embodiment of the invention the polymerization of the polymerizable composition is carried out under an atmosphere of inert gas, preferably under a nitrogen atmosphere.

In addition to the achiral and chiral compounds, the dyes and the polymerization initiators mentioned above, the thermochromic polymerizable mesogenic composition according to the present invention may also comprise one or more other suitable components such as, for example, catalysts, stabilizers, chain-transfer agents, co-reacting monomers or surface-active compounds.

In a preferred embodiment of the invention, the thermochromic polymerizable mesogenic composition comprises a stabilizer that is used to prevent undesired spontaneous polymerization for example during storage of the composition. As stabilizers in principal all compounds can be used that are known to those skilled in the art for this purpose. These compounds are commercially available in a broad variety. Typical examples for stabilizers are 4-ethoxyphenol or butylated hydroxytoluene (BHT).

It is also possible to add, for example, a quantity of up to 20% by weight of a non polymerizable liquid-crystalline compound to adapt the optical properties of the the polymers and polymer films obtainable from these compositions.

In addition or alternatively to the dye component mentioned above, the thermochromic polymerizable mesogenic composition can also compnse one or more dyes in order to influence or enhance the color appearance of the inventive polymer film.

For example, it is possible to add one or more organic dyes to the polymerizable composition which in combination with the reflective colors of the polymer film will result in special color effects.

Since the reflective colours of the helically twisted molecular structure are particularly well visible when viewed against a dark or black background, it is also possible to add dark or black pigments or dyes to the polymerizable composition in order to enhance the color appearance of the polymer film.

It is also possible, in order to increase crosslinking of the polymers, to add up to 20% of a non mesogenic compound with two or more polymerizable functional groups to the polymerizable composition alternatively or additionally to the multifunctional polymerizable mesogenic compounds.

Typical examples for difunctional non mesogenic monomers are alkyldiacrylates or alkyldimethacrylates with alkyl groups of 1 to 20 C atoms. Typical examples of non mesogenic monomers with more than two polymerizable groups are trimethylpropanetrimethacrylate or pentaerythritoltetraacrylate.

Polymerization of the polymerizable compositions comprising compounds with only one polymerizable functional group leads to linear polymers, whereas in the presence of compounds with more than one polymerizable functional group crosslinked polymers are obtained.

By varying the concentration of the multifunctional mesogenic or non mesogenic compounds the crosslink density of the polymers and thereby their physical and chemical properties such as the glass transition temperature, thermal and mechanical stability or the solvent resistance can be tuned easily.

In particular polymer films comprising crosslinked polymers show very high thermal stability of the optical and mechanical properties, depending on the degree of crosslinking, when compared to linear polymers. For example when a thermochromic composition comprising a polymerizable mesogenic compound having two polymerizable groups is polymerized, a polymer film is obtained that shows a helical pitch remaining substantially constant upon temperature variation.

In a preferred embodiment of the present invention the thermochromic polymerizable mesogenic composition comprises at least one compound of formula I having at least two polymerizable mesogenic groups and/or at least one compound of formula III having at least two polymerizable mesogenic groups. Such a composition upon polymerization gives crosslinked polymers.

In a preferred embodiment of the present invention, the thermochromic polymerizable mesogenic composition comprises the following components a1) 10 to 80% by weight of at least one achiral polymerizable mesogenic compound according to formula I having one polymerizable group,
a2) 0 to 70% by weight of at least one achiral polymerizable mesogenic compound according to formula I having two or more polymerizable groups,
b1) 10 to 95% by weight of at least one chiral polymerizable mesogenic compound according to formula III having one polymerizable group,
b2) 0 to 30% by weight of at least one chiral polymerizable mesogenic compound according to formula III having two or more polymerizable groups,
c) 0.01 to 5% by weight of a photoinitiator, and
d) 0 to 20% by weight of a dye component.

In a particularly preferred embodiment of the present invention, the thermochromic polymerizable mesogenic composition comprises
a1) 10 to 80%, preferably 15 to 65%, in particular 20 to 50% by weight of two or more achiral polymerizable mesogenic compounds having one polymerizable group, a2) 1 to 70%, preferably 2 to 55%, in particular 4 to 40% by weight of at least one achiral polymerizable mesogenic compound having two or more polymerizable groups,
b1) 10 to 95%, preferably 15 to 90%, in particular 20 to 80% by weight of two or more chiral polymerizable mesogenic compounds having one polymerizable group,
and further comprises component c) and optionally components b2) and d) in the concentration ranges as described above.

Compositions according to this particularly preferred embodiment are preferred that comprise two to eight, in particular two to six, most preferably two to four different achiral compounds having one polymerizable group and two to eight, in particular two to six, most preferably two to four different chiral compounds having one polymerizable group.

The ratio of each of the different achiral compounds having one polymerizable group in the mixture according to this particularly preferred embodiment is preferably 5 to 75%, in particular 8 to 65 %, very preferably 10 to 55% by weight of the total mixture.

The ratio of each of the different chiral compounds having one polymerizable group in the mixture according to this particularly preferred embodiment is preferably 5 to 90%, in particular 8 to 80 %, very preferably 10 to 70% by weight of the total mixture.

Furthermore preferred are compositions according to this particularly preferred embodiment that comprise at least one achiral compound having two or more polymerizable groups in the concentration range as described above.

In the compositions comprising two or more different achiral and chiral compounds having one polymerizable group selected of formula I and III as described above, preferably each of the different compounds according to formula I and III is different in at least one of the groups P, Sp, Sp*, X, MG, MG*, R or R* from each other of the compounds of the same component.

In another preferred embodiment of the present invention the thermochromic polymerizable compositions contain less than 10% by weight, very especially preferably none of the compounds having two or more polymerizable groups.

Further preferred are compositions according to the preferred embodiments described above that comprise alternatively or in addition to the components b1) and b2) 0.1 to 20%, preferably 0.2 to 10%, in particular 0.5 to 5% by weight of at least one non-polymerizable chiral compound that can also be mesogenic.

An inventive polymer film obtainable from a thermochromic polymerizable mesogenic composition by a process as described above has special color properties, since the above mentioned color changes can be observed not only for the reflective colors of the film, but also for the complementary secondary colors when being viewed in transmission (e.g. against a light source), after the film has been released from the substrate or has been obtained on a transparent substrate.

For example, an inventivee polymer film exhibits one or more reflection colors, which can be seen particularly well when being viewed against a dark background, and also shows the corresponding complementary colours when being viewed in transmission.

Furthermore, when being viewed against a dark background, such a film exhibits a color shift to shorter wavelengths.

Due to these special properties, which are very difficult to reproduce by other than the above described inventive methods, the inventive polymerized films are particularly suitable for security applications, such as false-proof identity or credit cards, banknotes, watermarks etc.

In particular a multi-colour image prepared by a multi-step curing process and by using a photomask exhibiting various grey shades, as described in the above preferred embodiment, is suitable for a use in security applications.

Without further elaboration one skilled in the art can, using the preceding description, utilize the present invention to its fullest extent. The following examples are, therefore, to be construed as merely illustrative and not limitative of the remainder of the disclosure in any way whatsoever.

All patents and publications, including EP 97 116 150.0 are hereby incorporated by reference.

In the foregoing and in the following examples, unless otherwise indicated, all temperatures are set forth uncorrected in degrees Celsius and all parts and percentages are by weight. The following abbreviations are used to illustrate the liquid crystalline phase behaviour of the compounds:

K=crystalline; N=nematic; S=smectic; Ch=cholesteric; I=isotropic. The numbers between these symbols indicate the phase transition temperatures in degrees Celsius.

EXAMPLE 1

The following polymerizable mixture is formulated

| compound (1) | 16.5% |
| compound (2) | 11.0% |
| compound (3) | 55.0% |
| compound (4) | 12.0% |
| compound (5) | 5.0% |
| Irgacure 651 | 0.5% |

(1)

(2)

(3)

(4)

(5)

The compounds (1) and (2) can be prepared as described in the GB 2,280,445 A. The synthesis of compounds (3) and (4) is described in the DE 195,04,224. Compound (5) can be prepared in analogy to the methods described in WO 93/22397.

Irgacure is a photoinitiator commercially available from Ciba Geigy AG (Basel, Switzerland).

The mixture shows the liquid crystal phase behaviour S 26.7 Ch 67.2 I, and exhibits the following color appearance when heated from the smectic phase (the numbers are temperature values in ° C.):

Smectic 26.7 Cholesteric Phase, Red 29 Light Green 31 Bright Green 41 Light Blue 50 Deep Blue 59 Violet Blue 67.2 Isotropic Phase.

Figure 1:
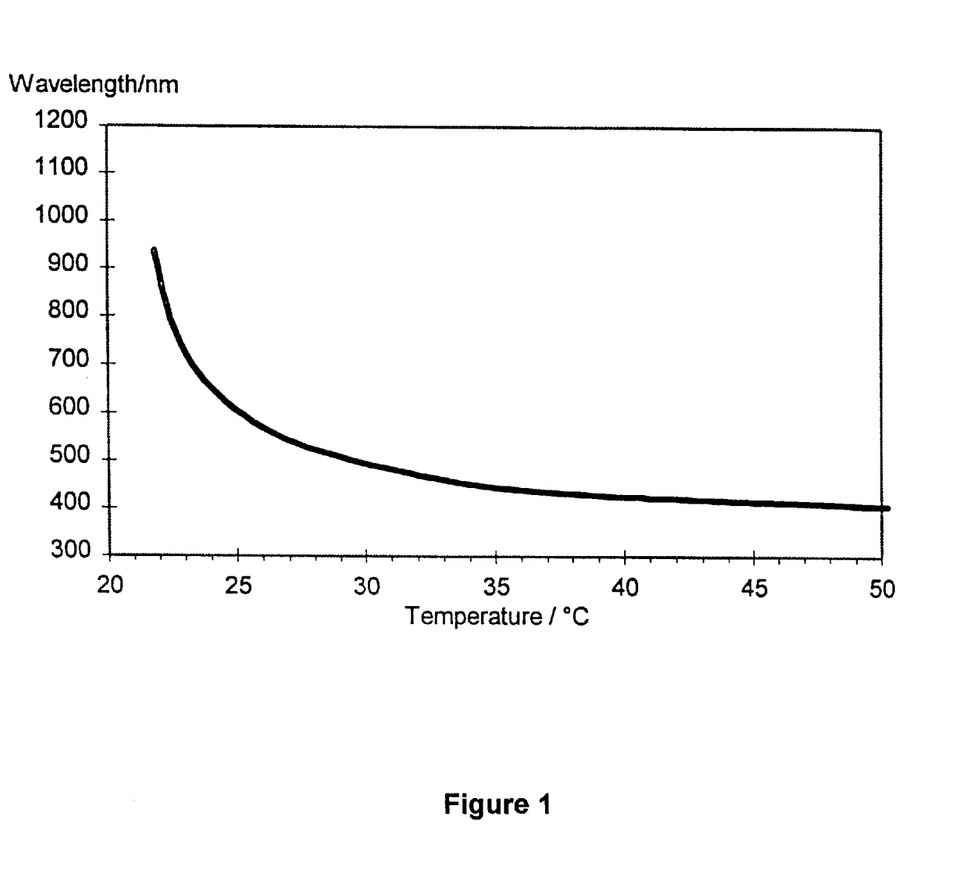
FIG. 1 shows the change of the reflective color versus the temperature of a thermochromic polymerizable mixture according to example 1 of the present invention.

The central wavelength of the reflective color shown by a thin film of this mixture was measured at different temperatures and is shown in FIG. 1.

EXAMPLE 2

A thin film of the polymerizable mixture of example 1 with a thickness of 5 μm is prepared between two glass slides and the sample positioned on a Linkam microscope hot stage at 22° C.

Figure 2:
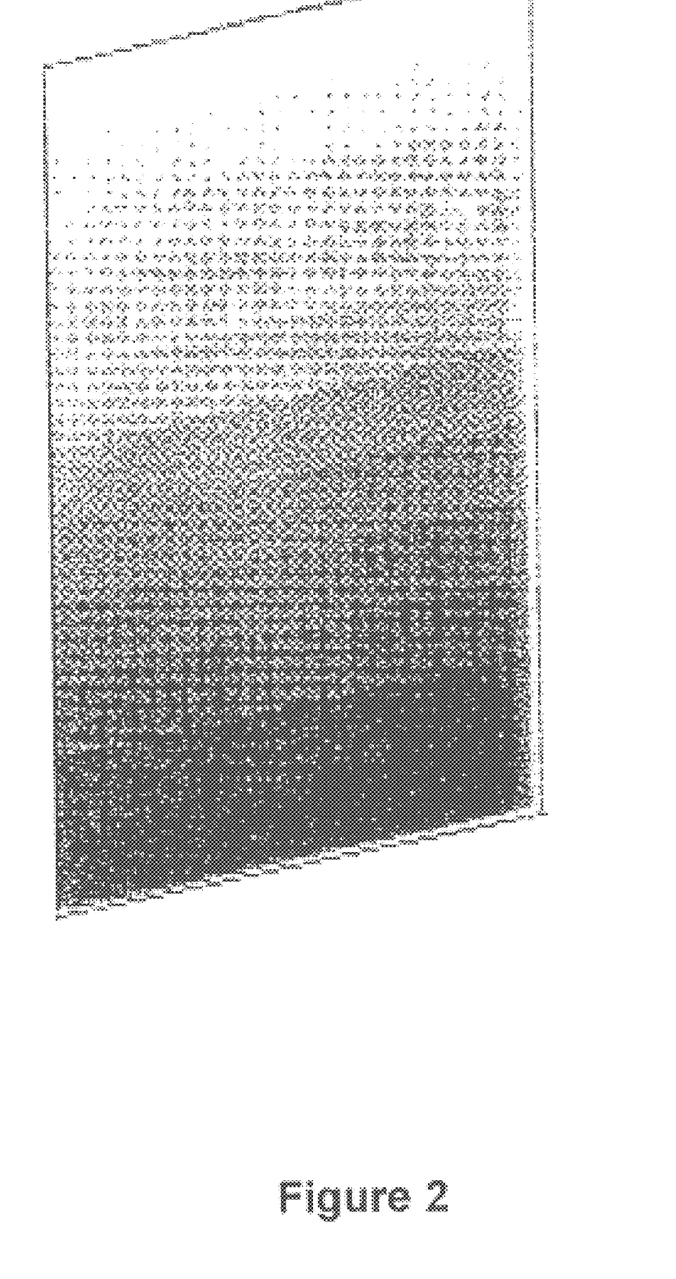
FIG. 2 shows a photomask used for the preparation of a polymer film according to example 2 of the present invention.

A graduated filter is prepared as a mask by printing a pattern comprising 11 zones with 0–100% grey shading in steps of 10% onto standard printing transparency used for overhead projection, and is shown in FIG. 2. This mask is positioned on top of the sample.

The sample comprising the film of the polymerizable mixture between the glass slides and the mask is held at 22° C. and irradiated with low power UV light (irradiance 25 mW/cm$^2$) for 20 seconds. Then the sample is heated at a controlled rate of 10.0 ° C./min up to 45° C. under continued UV irradiation. The sample is held at 45° C. and the UV irradiation is continued for a further 60 seconds.

Figure 3:
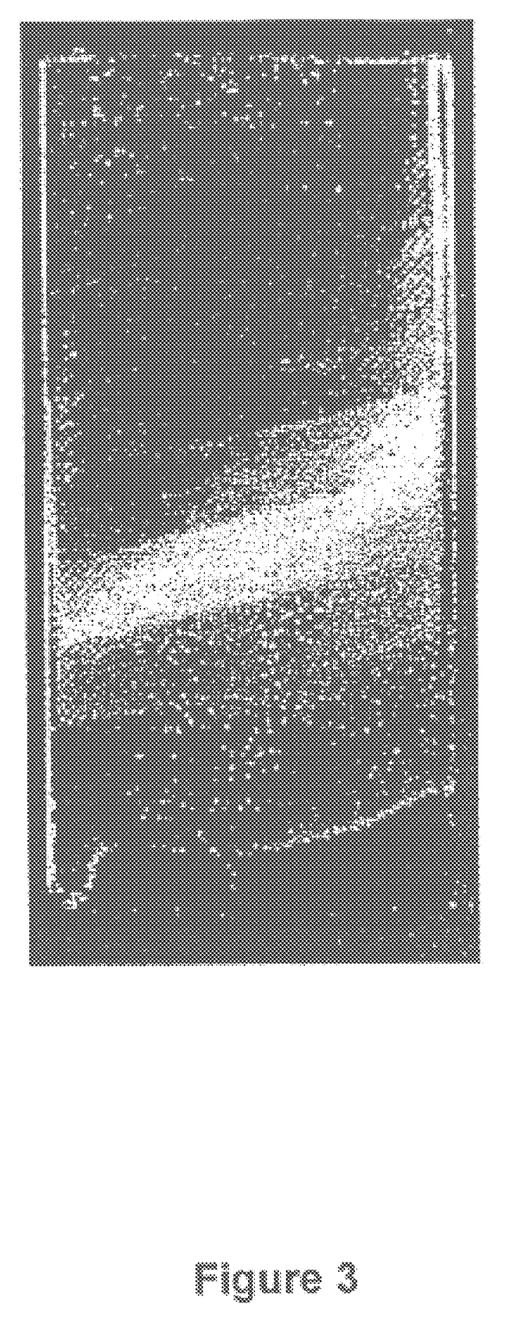
FIG. 3 shows a polymer film according to example 2 of the present invention when being viewed against a dark background.

The mask is removed and a polymer film as shown in FIG. 3 is obtained, which shows a range of reflective colours corresponding to the different masking efficiency of the zones in the mask.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various conditions and usages.

What is claimed is:

1. A polymer film with a helically twisted structure comprising at least one layer exhibiting at least two maxima of the selective reflection wavelength at a single viewing angle, prepared by a processing comprising
    A) coating a thermochromic polymerizable mesogenic composition comprising the following components
        a) at least one achiral polymerizable mesogenic compound,
        b) at least one chiral compound that is optionally also polymerizable and/or mesogenic
        c) a polymerization initiator, and
        d) optionally a dye component,
        on a substrate or between two substrates in the form of a layer,
    B) aligning the polymerizable mesogenic composition so that the axis of the molecular helix extends transversely to the layer,
    C) optionally heating at least a part of the aligned composition to a defined temperature,
    D) polymerizing at least a part of the aligned composition by exposure to actinic radiation,
    E) optionally repeating step D) alone or together with step C) and/or steps A) and B) at least once, and
    F) optionally removing the substrate or, if two substrates are present, one or both of the substrates from the polymerized material,
    characterized in that the temperature of the aligned composition is varied in step D).

2. A polymer film according to claim 1, wherein in said process, the temperature of the aligned composition in step D) is varied continuously.

3. A polymer film according to claim 1, wherein in said process, the temperature of the aligned composition in step D) is varied continuously.

4. A polymer film according to claim 1, wherein in step D) of said process, the thermochromic polymerizable mesogenic composition is covered at least partially with a photomask.

5. A polymer film according to claim 4, wherein in said process, the photomask exhibits at least one part having a transmission of the actinic radiation used in step D) that is different from at least one other part of the photomask.

6. A polymer film according to claim 1, wherein component b) of the thermochromic polymerizable mesogenic composition is comprised of at least one polymerizable mesogenic chiral compound.

7. A polymer film according to claim 1, exhibiting at least two different reflection maxima in the visible wavelength range.

8. A polymer film as in claim 1 wherein the thermochromic mesogenic composition comprises
   a) 10 to 80% by weight of at least one achiral polymerizable mesogenic compound having one polymerizable group,
   b) 0 to 70% by weight of at least one achiral polymerizable mesogenic compound having two or more polymerizable groups,
   c) 10 to 95% by weight of at least one chiral polymerizable mesogenic compound having one polymerizable group,
   d) 0 to 30% by weight of at least one chiral polymerizable mesogenic compound having two or more polymerizable groups,
   e) 0.01 to 5% by weight of a photoinitator, and
   f) 0 to 20% by weight of a dye component.

9. A polymer film with a helically twisted structure comprising at least one layer exhibiting at least two maxima of the selective reflection wavelength at a single viewing angle, prepared by a processing comprising
   a) at least one achiral polymerizable mesogenic compound,
   b) at least one chiral compound that is optionally also polymerizable and/or mesogenic
   c) a polymerization initiator, and
   d) optionally a dye component,
   on a substrate or between two substrates in the form of a layer,
   B) aligning the polymerizable mesogenic composition so that the axis of the molecular helix extends transversely to the layer,
   C) optionally heating at least a part of the aligned composition to a defined temperature,
   D) polymerizing at least a part of the aligned composition by exposure to actinic radiation,
   E) optionally repeating step D) alone or together with step C) and/or steps A) and B) at least once, and
   F) optionally removing the substrate or, if two substrates are present, one or both of the substrates from the polymerized material, characterized in that the temperature of the aligned composition is varied in step D)
   a) 10 to 80% by weight of two or more achiral polymerizable mesogenic compounds having one polymerizable group,
   b) 1 to 70% by weight of at least one achiral polymerizable mesogenic compound having two or more polymerizable groups,
   c) 10 to 95% by weight of two or more chiral polymerizable mesogenic compounds having one polymerizable group,
   d) 0 to 30% by weight of at least one chiral polymerizable mesogenic compound having two or more polymerizable groups,
   e) 0.01 to 5% by weight of a photoinitiator, and
   f) 0 to 20% by weight of a dye component.

10. A polymer film according to claim 1 wherein the substrate in step A is another polymer film prepared according to a process comprising steps A–F of claim 1.

11. A process of preparing a polymer film with a helically twisted molecular structure exhibiting at least two maxima of the selective reflection wavelength comprising steps A–F of claim 1.

12. A process of preparing a polymer film with a helically twisted molecular structure exhibiting at least four maxima of the selective reflection wavelength comprising steps A–F of claim 1.

13. A method of using a polymer film with a helically twisted molecular structure according to claim 1 which comprises incorporating said polymer film in an optical data storage device, photomask, decorative pigment, cosmetic, security device or active and passive optical element.

* * * * *